United States Patent
Caine

(10) Patent No.: US 7,876,199 B2
(45) Date of Patent: Jan. 25, 2011

(54) METHOD AND APPARATUS FOR CONTROLLING A SKIN TEXTURE SURFACE ON A DEVICE USING A SHAPE MEMORY ALLOY

(75) Inventor: Michael E. Caine, Needham, MA (US)

(73) Assignee: Motorola, Inc., Schaumburg, IL (US)

( * ) Notice: Subject to any disclaimer, the term of this patent is extended or adjusted under 35 U.S.C. 154(b) by 854 days.

(21) Appl. No.: 11/696,481

(22) Filed: Apr. 4, 2007

(65) Prior Publication Data

US 2008/0248247 A1    Oct. 9, 2008

(51) Int. Cl.
*H04B 3/36* (2006.01)
(52) U.S. Cl. .................... 340/407.2; 340/407.1
(58) Field of Classification Search .............. 340/407.2, 340/407.1
See application file for complete search history.

(56) References Cited

U.S. PATENT DOCUMENTS

| | | | |
|---|---|---|---|
| 5,685,721 A | 11/1997 | Decker | |
| 5,727,391 A | 3/1998 | Hayward et al. | |
| 5,766,013 A | 6/1998 | Vuyk | |
| 6,107,995 A | 8/2000 | Dordick | |
| 6,109,922 A * | 8/2000 | Litschel et al. | 434/114 |
| 6,169,538 B1 | 1/2001 | Nowlan et al. | |
| 6,292,573 B1 | 9/2001 | Zurek et al. | |
| 6,678,534 B2 | 1/2004 | Ishigaki | |
| 6,776,619 B1 * | 8/2004 | Roberts et al. | 434/113 |
| 6,781,284 B1 | 8/2004 | Pelrine et al. | |
| 6,881,063 B2 | 4/2005 | Yang | |
| 6,882,086 B2 | 4/2005 | Kornbluh et al. | |
| 6,988,247 B2 | 1/2006 | Janevski | |

(Continued)

FOREIGN PATENT DOCUMENTS

EP    1717667 A    11/2006

(Continued)

OTHER PUBLICATIONS

Pasquero, Jerome et al.; Haptically Enabled Handheld Information Display with Distributed Tactile Transducer; IEEE Transactions on Multimedia; Oct. 15, 2006; pp. 1-9.

(Continued)

*Primary Examiner*—Travis R Hunnings
(74) *Attorney, Agent, or Firm*—Vedder Price P.C.

(57) ABSTRACT

A portable electronic device (100) includes a controllable skin texture surface that includes a skin texture surface actuation structure having a plurality of hinged elements (802-808) with a shape memory alloy (812) coupled thereto to effect movement of the hinged elements and a flexible skin structure (320) to change a tactile configuration of at least a portion of the controllable skin texture surface. A method also includes controlling a first shape memory alloy to actuate a plurality of hinged elements and in response, controlling a second shape memory alloy to actuate a hinged lock structure to lock a plurality of hinged elements in a first position. The method also includes deactivating the first shape memory alloy and unlocking the plurality of hinged elements by actuating the first shape memory alloy to allow the hinged lock to disengage. Corresponding structure is also disclosed. The electronic device may include a passive or active shape memory alloy based hinged locking structure to facilitate a bi-stable texture element actuation configuration.

17 Claims, 10 Drawing Sheets

U.S. PATENT DOCUMENTS

| | | | |
|---|---|---|---|
| 7,002,533 | B2 | 2/2006 | Sayag |
| 7,009,595 | B2* | 3/2006 | Roberts et al. ............... 345/156 |
| 7,064,472 | B2 | 6/2006 | Pelrine et al. |
| 7,148,875 | B2 | 12/2006 | Rosenberg et al. |
| 7,306,463 | B2 | 12/2007 | Hanley |
| 2003/0048260 | A1 | 3/2003 | Matusis |
| 2003/0122779 | A1 | 7/2003 | Martin et al. |
| 2004/0029082 | A1 | 2/2004 | Fournier et al. |
| 2004/0038186 | A1* | 2/2004 | Martin et al. ............... 434/113 |
| 2004/0107080 | A1 | 6/2004 | Deichmann et al. |
| 2005/0062881 | A1 | 3/2005 | Caci et al. |
| 2005/0184959 | A1 | 8/2005 | Kompe et al. |
| 2005/0219223 | A1 | 10/2005 | Kotzin et al. |
| 2005/0253643 | A1 | 11/2005 | Inokawa et al. |
| 2006/0046031 | A1 | 3/2006 | Janevski |
| 2006/0103634 | A1 | 5/2006 | Kim et al. |
| 2006/0161870 | A1 | 7/2006 | Hotelling et al. |
| 2006/0161871 | A1 | 7/2006 | Hotelling et al. |
| 2006/0192771 | A1 | 8/2006 | Rosenberg et al. |
| 2006/0238510 | A1 | 10/2006 | Panotopoulos et al. |
| 2007/0013677 | A1 | 1/2007 | Rosenberg et al. |

FOREIGN PATENT DOCUMENTS

| | | |
|---|---|---|
| KR | 1020050055841 | 6/2005 |
| KR | 1020050106698 | 11/2005 |
| KR | 1020060027655 | 3/2006 |
| KR | 1020060096869 | 9/2006 |
| WO | WO 0199086 A | 12/2001 |
| WO | WO 2006108121 A | 10/2006 |

OTHER PUBLICATIONS

Luk, Joseph et al.; A Role for Haptics in Mobile Interaction: Initial Design Using a Handheld Tactile Display Prototype; ACM; 2006; pp. 1-10.

Liu, Chang et al.; Scaling Laws of Microactuators and Potential Applications of Electroactive Polymers in MEMS; Proceedings of SPIE's 6th Annual Int'l Symposium; Mar. 1999; pp. 1-10.

Haga, Y. et al.; Medical and welfare applications of shape memory alloy microcoil actuators; Institute of Physics Publishing; Aug. 24, 2005; pp. S266-S272.

Takamiya, Makoto et al.; Lower Power and Flexible Braille Sheet Display with Organic FET's and Plastic Actuators; IEEE; 2006; pp. 1-4.

Moy, G. et al.; A Compliant Tactile Display for Teletaction; Proceedings of the 2000 IEEE; Apr. 2000; pp. 3409-3415.

Konyo, Masashi et al.; Artificial Tactile Feel Display Using Soft Gel Actuators; Proceedings of the 2000 IEEE; Apr. 2000; pp. 3416-3421.

Benali-Khoudja, Mohamed et al.; Vital: A New Low-Cost VIbro-TActiLe Display System; Proceedings of the 2004 IEEE; Apr. 2004; pp. 721-726.

Velazquez, Ramiro et al.; A Low-Cost Highly-Portable Tactile Display Based on Shape Memory Alloy Micro-Actuators; IEEE Int'l Conference; Jul. 2005; pp. 121-126.

Velazquez, Ramiro et al.; Miniature Shape Memory Alloy Actuator for Tactile Binary Information Display; Proceedings of the 2005 IEEE; Apr. 2005; pp. 1344-1349.

Yoshikawa, Tsuneo et al.; A Touch and Force Display System for Haptic Interface; Proceedings of the 1997 IEEE; Apr. 1997; pp. 3018-3024.

Y. Bar-Cohen et al.; Scaling Laws of Microactuators and Potential Applications of EAP in MEMS; SPIE 6th Annual Int'l Symposium; Mar. 1999; p. 1.

Velazquez, Ramiro et al.; A Compact Tactile Display for the Blind with Shape Memory Alloys; pp. 1-6.

Grant, Danny et al.; Constrained Force Control of Shape Memory Alloy Actuators; Proceedings of the 2000 IEEE; Apr. 2000; pp. 1314-1320.

Dai, Steve; Actuator2004; internal trip report; posted on Compass; Jun. 2004; pp. 1-4.

HTML Basics: Page Format Guidelines; from www.jegsworks.com; Jan. 2008; pp. 1-6.

Miller, Nate; OpenGL Texture Mapping: An Introduction; from www.gamedev.net; Feb. 29, 2000; pp. 1-5.

International Search Report from EP Patent Office; PCT Application No. PCT/US2008/058546; dated Jul. 3, 2008; pp. 1-13.

International Search Report for International Application No. PCT/US08/68961; Jan. 29, 2009, 3 pp.

Written Opinion for International Application No. PCT/US08/668961, Jan. 29, 2009, 4 pp.

International Search Report for International Application No. PCT/US08/73790, Mar. 20, 2009, 3 pp.

Written Opinion for International Application No. PCT/US08/73790, Mar. 20, 2009, 3 pp.

International Search Report for International Application No. PCT/US08/084111, Jun. 24, 2009.

"Shape Memory Alloys—Frequently Asked Questions"; from www.azom.com; Aug. 10, 2010.

* cited by examiner

METHOD AND APPARATUS FOR CONTROLLING A SKIN TEXTURE SURFACE ON A DEVICE USING A SHAPE MEMORY ALLOY

RELATED CO-PENDING APPLICATIONS

This application is related to co-pending applications entitled "METHOD AND APPARATUS FOR CONTROLLING A SKIN TEXTURE SURFACE ON A DEVICE", filed on even date, Ser. No. 11/696,466, inventor Michael E. Caine, owned by instant Assignee and is incorporated herein by reference; "METHOD AND APPARATUS FOR CONTROLLING A SKIN TEXTURE SURFACE ON A DEVICE USING HYDRAULIC CONTROL", filed on even date, Ser. No. 11/696,496, inventor Michael E. Caine, owned by instant Assignee and is incorporated herein by reference; and "METHOD AND APPARATUS FOR CONTROLLING A SKIN TEXTURE SURFACE ON A DEVICE USING A GAS", filed on even date, Ser. No. 11/696,503, inventor Michael E. Caine, owned by instant Assignee and is incorporated herein by reference.

FIELD OF THE INVENTION

The disclosure relates generally to portable electronic devices and more particularly to portable electronic devices that employ variable skin texture surfaces.

BACKGROUND OF THE INVENTION

Portable electronic devices, such as laptops, wireless handheld devices such as cell phones, digital music players, palm computing devices, or any other suitable devices are increasingly becoming widespread. Improved usability of such devices can increase sales for sellers as consumer demand can be driven by differing device usability characteristics and device features.

Providing differing device usability such as by changing the tactile configuration and/or visual appearance of a surface of a portable electronic device by altering the emission reflection of light to change the overall color or graphics that appear and disappear are known. Surfaces of electronic devices, including portable electronic devices may include, for example, exterior surfaces of the device, activation keys such as keys in a keypad or navigation keys, tactile navigation interfaces, or any other suitable surface.

Also, as one example to enhance the tactile configuration and/or visual appearance of a device, it has been proposed to employ haptics such as in the form of electro-active polymers that change 3D shape, also referred to as texture, based on the application of a voltage to portions of the electro-active polymer. Differing textures and shapes can thereby be produced to give the device a different visual appearance and/or tactile configuration. For example, if a portable device includes such electro-active polymers as a type of outer skin, turning power on to the device can cause the electro-active polymer to be activated so that a 3D texture is present and can be felt by a user of the device. It has also been proposed to use piezoelectric actuators as a type of haptic sensor on handheld devices. In one example, a control slider is configured as a bending piezo-actuator. Also it has been proposed to provide handheld devices with menus, such as piezo-actuated haptic icons, that have different tactile feedback for a user so that the user can, for example, turn a phone to a "silent" mode from an active mode by feeling the proper control key and receiving feedback of actuation of the key once it is activated. It is desirable to provide differing methods and apparatus for actuating skin texture surfaces of a device and differing user experiences.

BRIEF DESCRIPTION OF THE DRAWINGS

The present invention and the corresponding advantages and features provided thereby will be best understood and appreciated upon review of the following detailed description of the invention, taken in conjunction with the following drawings, where like numerals represent like elements, in which.

DETAILED DESCRIPTION OF THE EMBODIMENTS

Figure 1:
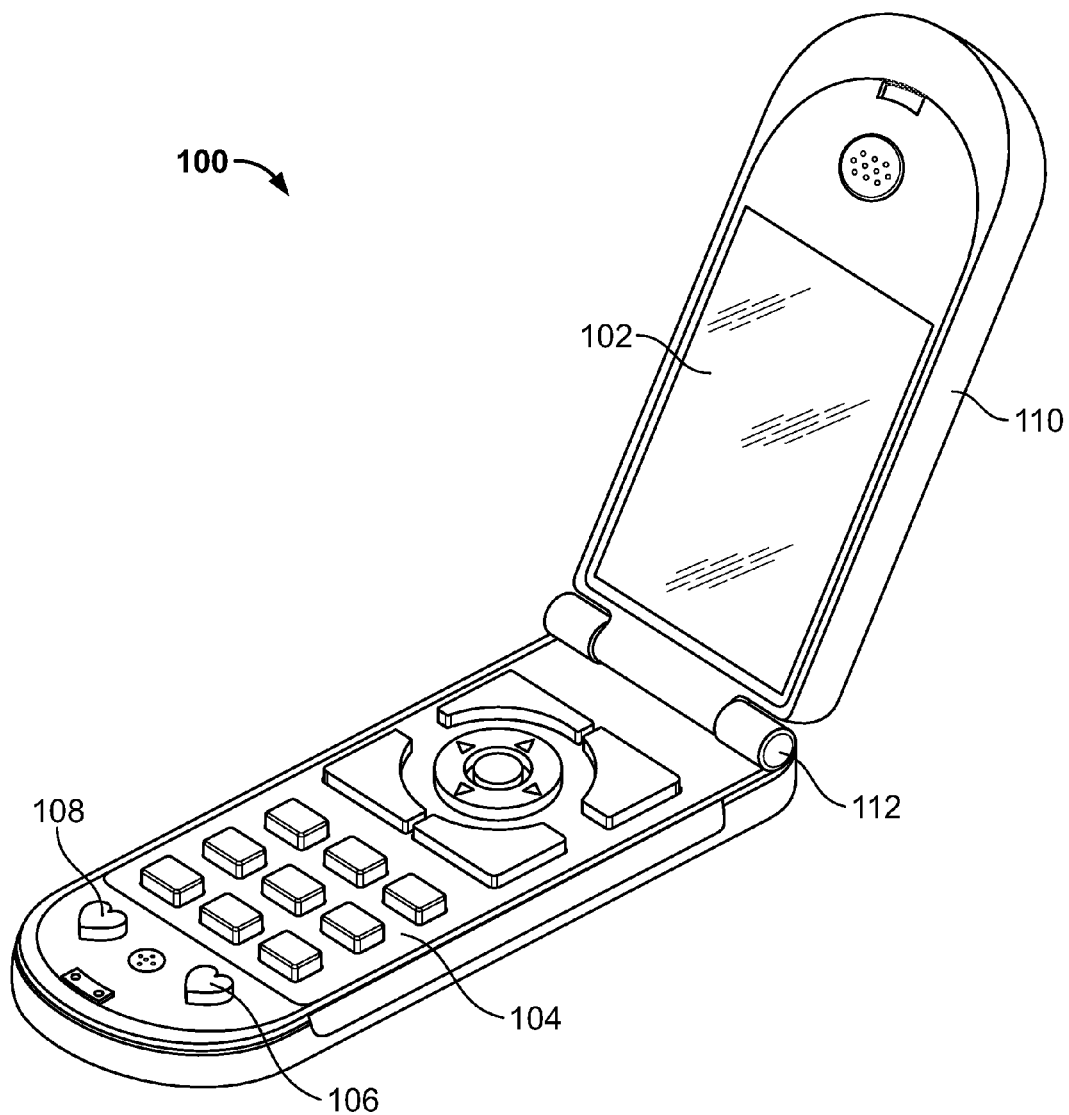
FIG. 1 is a perspective view of an example of a wireless handheld device that employs a controllable skin texture surface in accordance with one embodiment of the invention.

Briefly, in one example, a portable electronic device includes a controllable skin texture surface that includes a skin texture surface actuation structure having a plurality of hinged elements with a shape memory alloy coupled thereto to effect movement of the hinged elements and a flexible skin structure to change a tactile configuration of at least a portion of the controllable skin texture surface. A method also includes controlling a first shape memory alloy to actuate a plurality of hinged elements and in response, controlling a second shape memory alloy to actuate a hinged lock structure to lock a plurality of hinged elements in a first position. The method also includes deactivating the first shape memory alloy and unlocking the plurality of hinged elements by actuating the first shape memory alloy to allow the hinged lock to disengage. Corresponding structure is also disclosed. The electronic device may include a passive or active shape memory alloy based hinged locking structure to facilitate a bi-stable texture element actuation configuration.

In another example, a portable electronic device includes a controllable skin texture surface and control logic that is operative to change a tactile configuration of at least a portion of the controllable skin texture surface in response to at least any one (i.e., one or more) of: a received wireless signal, a battery level change condition, an incoming call or message, information from a proximity sensor, sound sensor, light sensor, accelerometer or other sensor that measures environmental conditions, data representing a user of the device, or data representing completion of a user authentication sequence. The portion of the controllable skin texture surface may be part of a non-user interface portion or a user interface portion, such as a function key, keypad or other operational element of the device.

The controllable skin texture surface may include a mechanical actuation structure that is coupled to a flexible skin texture, such as a polyurethane layer, rubber composite or any other suitable material that moves in response to moving of the mechanical actuation structure. The flexible skin structure may be affixed to a substrate including a portion of a device housing or any other suitable surface and may be formed by separate pieces or a unitary piece. The controllable skin texture surface may include a hydraulic actuation structure that is coupled to the flexible skin structure that moves in response to movement of fluid in the hydraulic actuation structure. In another example, the controllable skin texture surface may include an expandable gas actuation structure that is operatively coupled to a flexible skin structure that moves in response to movement of gas in the expandable gas actuation structure. Also if desired, the controllable skin texture surface may include a shape memory alloy actuation structure that is operatively coupled to a flexible skin structure that moves in response to movement of a metal alloy in the shape memory alloy actuation structure. Any desired combination of these different structures may also be used. The controllable skin texture surfaces include a flexible skin structure that is raised or lowered to provide, for example, a raised feature (e.g., one or more skin texture elements) that can be tactically detected by a user or visually detected by a user if desired. Touch sensors, such as capacitive elements, dome key switches or other suitable elements may be used to detect when a user touches portions of the flexible surface such as non-raised or raised features, to correspond, for example, to a button press or similar functional input from the user or to actuate the controllable skin texture. It is also possible to place contact switches, such as dome-type switches known in the art, below the flexible skin structure so as to be actuated by the push of a user's finger.

In one example, the controllable skin texture surface is controlled to cause the controllable skin texture surface on the device to pulsate or otherwise change in a time-varying manner. In addition, other visual effects may be employed including providing lighting in addition to skin texture surface control to illuminate portions of the skin texture differently in response to different control conditions.

In one example, a portable electronic device employs a controllable skin texture surface that includes a mechanical skin texture surface actuation structure that includes a sliding element operative to cause movement of portions of the flexible skin structure. In one example, the sliding element is a movable ramp structure. The flexible skin structure moves in response to movement of the movable ramp structure to change a tactile configuration of at least a portion of the controllable skin texture surface. In another example, the sliding element is a flat flexible sliding element. The skin structure moves in response to movement of the sliding element to change a tactile configuration of at least a portion of the controllable skin texture surface.

In one example, the movable ramp structure includes a plurality of ramps either on a single plate or on multiple moving plates. A cam or rack & pinion structure may be linked with the plurality of ramps and controlled either electronically or mechanically, to move at least one of the plurality of ramps in response to an electronic control signal or mechanical movement of a portion of the device. Mechanical movement of a portion of the device may include by way of example, the moving of a flip portion of a flip phone or the cover of a laptop device. In another example, the movable ramp structure includes wedge shaped elements and a movable ramp structure that engages with the wedge shaped elements such that movement of the ramp structure causes movement of the wedge shaped elements and movement of the flexible skin texture to produce raised (or lowered) skin texture portions as the ramps are moved. A handheld wireless device is also disclosed that employs the above structures and also includes, a wireless telephone subsystem, display, and other conventional electronics and functionality in addition to the controllable skin texture surfaces described herein.

FIG. 1 illustrates one example of a portable electronic device 100, shown in this example to be a handheld wireless device, that includes a wireless telephone subsystem for communication via one or more suitable wireless networks, and other conventional circuitry along with a display 102 for displaying information to a user that is coupled to the wireless telephone subsystem as known in the art. The portable electronic device 100 also includes a controllable skin texture surface 104 that in this example, covers a portion of a housing (e.g., base housing) of the device 100 that forms part of a user interface portion, namely a user keypad. The controllable skin texture surface 104 also includes other controllable surfaces 106 and 108 that are for aesthetic purposes and are controlled to change the tactile configuration of a non-user interface portion of the portable electronic device, such as another area of the outer portion of the device. As shown in this particular example, the portable electronic device 100 is a flip phone having a foldable housing portion 110 that pivots about a pivot mechanism 112 as known in the art. The foldable housing portion 110 may also include a keypad and controllable skin texture surface as desired. The controllable skin texture surface 104 is controlled to change the tactile configuration of a portion of the skin texture surface to, in this example, raise respective portions of the skin texture to provide a tactilely detectable keypad and other tactile and/or aesthetic features. In one example, the controllable skin texture surface 104 may be flat when, for example, the phone is in a standby mode, but the controllable skin texture surface 104 is controlled to activate portions thereof to provide raised keys for a keypad when an incoming wireless call is detected and is controlled to become flat (deactivated) when a call ends. Other input information is also used to control the actuation/deactuation of the controllable skin texture as described below.

Figure 2:
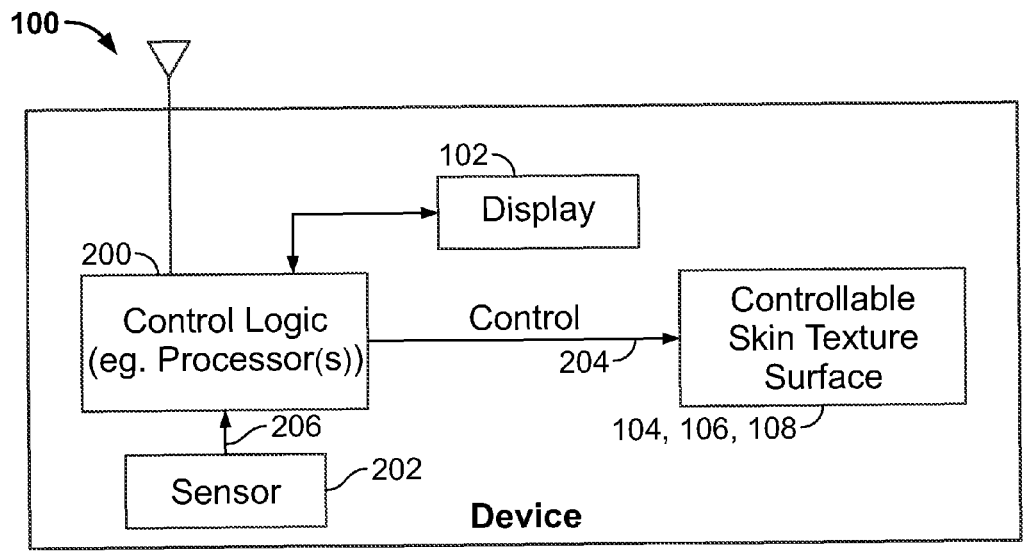
FIG. 2 is a block diagram illustrating one example of an apparatus that includes control logic that controls a controllable skin texture surface in accordance with one embodiment of the invention.

FIG. 2 illustrates in block diagram form the portable electronic device of FIG. 1 or any other suitable portable electronic device such as a laptop computer, portable Internet appliance, portable digital media player, or any other suitable portable electronic device. As shown, control logic 200 changes a tactile configuration of a portion of the controllable skin texture surface 104 (and/or 106 and 108) by producing control information 204 (e.g., digital or analog signals) in response to at least any one of a received wireless signal, a battery level change condition such as a low battery condition, based on an incoming call or message, based on information from a proximity sensor, sound sensor, light sensor or other environmental sensor generally designated as 202, or data representing a user of the device, such as the input via a microphone and a voice recognition module that recognizes the user's voice, or a password or passcode entered by a user indicating a particular user, or data representing completion of a user authentication sequence such as the entry of a password and PIN or any other suitable authentication process as desired. Other data may also be used such as control data based on a pressure sensor, humidity sensor, shock sensor or vibration sensor. State changes may also be used to control the texture such as, but not limited to, radio signal strength, device orientation, device configuration (e.g., flip open, phone mode vs. audio playback mode vs. camera mode), a grip of a user or data representing a change of state of a program executing on a device, including the state of a program executing on another device connected via a wired or wireless connection such as a server or another portable device. Other incoming data representing other incoming signals may include, for example, changing or controlling the texture based on an incoming SMS, email or instant message, a proximity to a radio source such as an RFID reader, a Bluetooth™ enabled device, a WIFI access point, or response from an outgoing signal such as a tag associated with an RFID. Other data that may be suitable for triggering or controlling the activation of the texture may include data representing the completion of a financial transaction, completion of a user initiated action such as sending a message, downloading a file or answering or ending a call, based on a timeout period, based on the location of the device relative to some other device or an absolute location such as a GPS location, status of another user such as the online presence of another instant message user, availability of a data source such as a broadcast TV program or information in a program guide, based on game conditions such as a game that is being played on the device or another networked device, based on for example, other modes of data being output by the device such as the beat of music, patterns on a screen, actions in a game, lighting of a keypad, haptic output, or other suitable data. By way of example, the control logic 200 may raise portions of the controllable skin texture surface 104 to represent keys, in response to sensor output information 206 such as the sensor 202 detecting the presence of a user, based on a sound level detected in the room, or output based on the amount of light in a room.

For example, if the light level in a room decreases to a desired level as sensed by a light sensor, the sensor 202 outputs the sensor output information 206 and the control logic 200 may activate the controllable skin texture surface 104 to provide a raised keypad feature so that the user can feel the keypad surface in a dark room since there is not much light to see the keypad. In addition if desired, light source(s) such as LEDs located underneath the controllable skin texture surface may also be illuminated under control of the control logic in response to the light sensor detecting a low light level in the vicinity of the device. A sound sensor may also be used, for example, to control which portions of the controllable skin texture surface are used depending upon, for example, the amount of noise in a room. In addition, the control logic 200 may control the controllable skin texture surface 104, 106 or 108 to provide a pulsating action, or any other suitable tactile configuration as desired based on the sensor output information. For example, the device of FIG. 1 may have controllable skin texture surface 104 configured about the exterior of the device so that when the skin texture surface is activated (e.g., raised) in certain portions, the device appears to be pulsating, like a heartbeat, or may provide a sequential raising and lowering of certain portions of the skin texture to provide a user desired movement, such as an animated pattern.

The control logic 200 may be implemented in any suitable manner including a processor executing software module that is stored in a storage medium such as RAM, ROM or any other suitable storage medium which stores executable instructions that when executed, cause one or more processors to operate as described herein. Alternatively, the control logic as described herein, may be implemented as discrete logic including, but not limited to, state machines, application specific integrated circuits, or any suitable combination of hardware, software or firmware.

In one example, the controllable skin texture surface 104, 106, and 108 may include a mechanical actuation structure that is coupled to a flexible skin structure that moves in response to moving of the mechanical actuation structure, a hydraulic actuation structure that is coupled to a flexible skin structure that moves in response to movement of fluid in the hydraulic actuation structure, and expandable gas actuation structure that is coupled to a flexible skin structure that moves in response to movement of gas in the expandable gas actuation structure and a shape memory alloy actuation structure that is coupled to a flexible skin structure that moves in response to movement of a metal alloy in the shape memory alloy actuation structure, or any suitable combination thereof.

Figure 3:
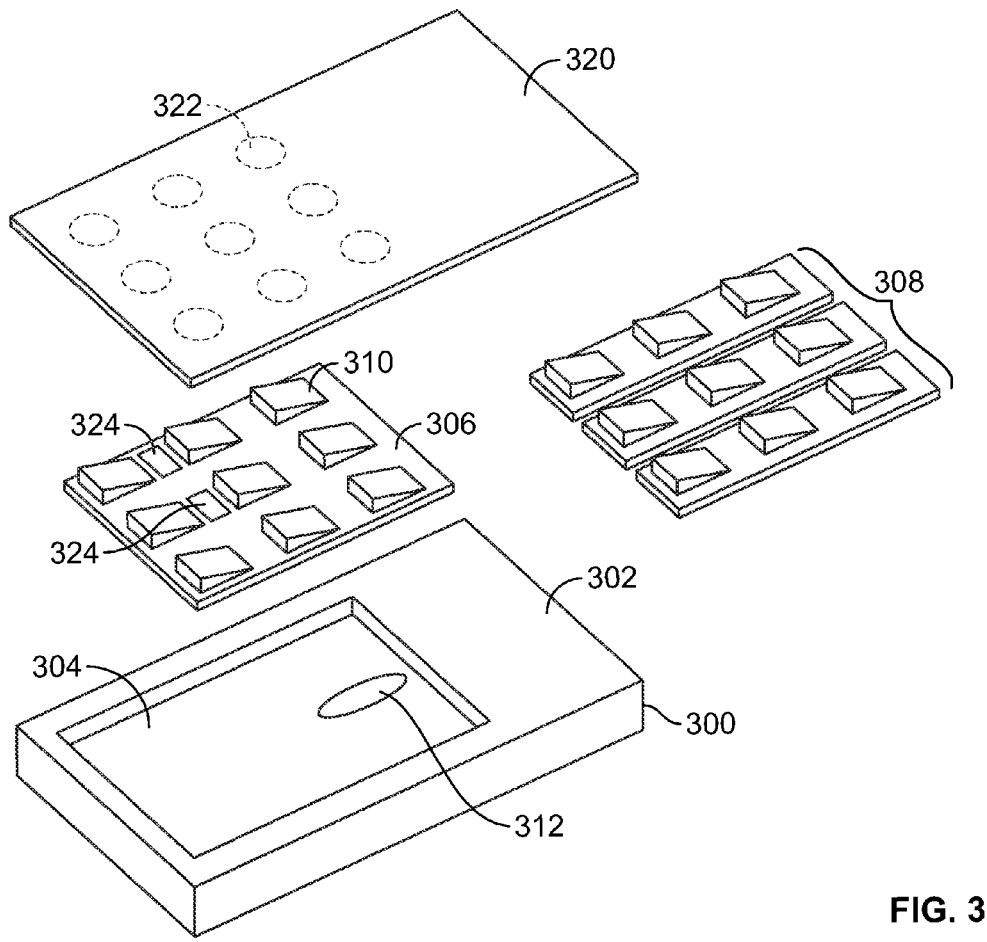
FIG. 3 is an assembly view of a portion of an apparatus in accordance with one embodiment of the invention.

FIGS. 3-7 illustrate various examples of a mechanical actuation structure that is used to move a flexible skin structure in response to the moving of the mechanical actuation structure. Referring to FIG. 3, a portable electronic device 300, is shown, which may be any suitable portable electronic device as desired. The particulars of the device depend on the desired application. In this example, the portable electronic device 300 includes a housing 302 with a recessed area 304 that receives one or more movable ramp structures 306 or 308. Ramp structure 306 as shown here includes a single plate that has a plurality of ramp portions 310 that are raised with respect to the plate. The plate slidably moves in the recessed area 304 and is allowed to slide back and forth in the recessed area. As recognized, any suitable configuration may be used to provide the sliding operation. The plate is moved by an actuator 312 such as a cam or motor or any combination thereof or any other suitable structure. The controllable skin texture surface includes a flexible skin structure 320 that, in this example, includes molded texture elements that may be any suitable shape and size, shown in this example as texture pockets generally shown as 322 in the configuration of a keypad. The texture pockets 322 are molded as pockets in an under portion of the flexible skin structure 320 and are raised up by corresponding ramps 310 on the ramp structure 306 when the ramp structure is moved. Hence, the texture pockets 322 are raised under control of the actuator 312. The flexible skin structure covers the ramps and may be affixed to the housing or other structure as desired. It will be recognized that one ramp may be used to move multiple texture elements and that the ramps may also be any suitable configuration (including shape or size).

The flexible skin structure 320 may be made out of any suitable flexible material including, but not limited to polyurethane, rubber, or silicone. It may be suitably attached to an outer portion of the housing of the device 300 via an adhesive or any other suitable mechanism. The flexible skin structure 320 as shown has a portion that covers the movable ramp structure 306. When the movable ramp structure 306 pushes up the molded pockets 322, it changes the tactile configuration of the controllable skin texture surface so a user will feel the locations below the ramps on the flexible skin structure 320. As shown, there may be touch sensors 324, shown as capacitive sensors positioned on the ramp structure 306 at locations between the ramps if desired, or on top of the ramps if desired which when touched by a user, generate a signal that is interpreted by the control logic of the device 300 to be an activation of a key, in this particular example. It will be recognized that touch sensors 324 may be any suitable sensor and may be located at any suitable location within the device as desired. The texture pockets 322 may be, for example, thinned out sections that are molded into a rear surface of the flexible skin structure 320. However, any suitable configuration may be used. In this example, the flexible skin structure 320 includes a layer of flexible material that have a plurality of defined changeable skin texture elements 322, each having a portion configured to engage with the movable ramp structure 306. The capacitive sensor serves as a type touch sensor 324.

Figure 4:
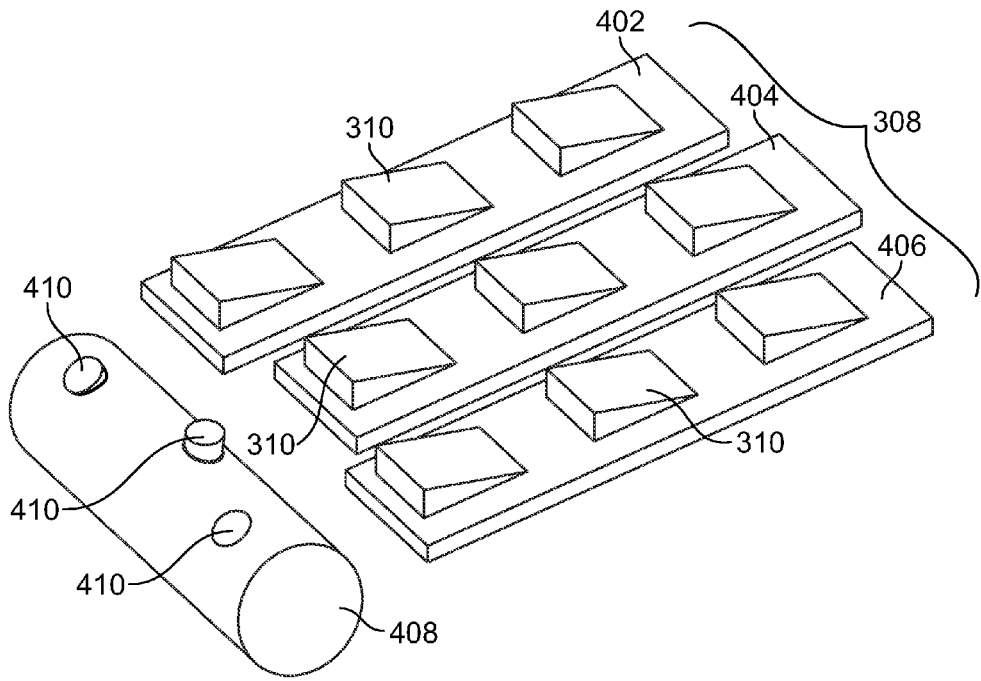
FIG. 4 is a perspective view illustrating one example of a portion of a mechanical actuation structure that may be part of a controllable skin texture surface in accordance with one embodiment of the invention.

FIG. 4 illustrates an alternative embodiment to the single plate shown in FIG. 3. In this example, a multiple segment movable ramp structure 308 includes a plurality of ramps 402, 404, 406 and a cam structure 408 that mechanically engages with, for example, edges of the plurality of ramps to move at least one of the plurality of ramps in response to, in one example, mechanical movement of a portion of the device. For example, if the device has a clam type housing design, movement of the clam housing causes rotation of the rotating cam 408 through a suitable mechanical linkage. Alternatively, a motor may be controlled to actuate the movement of the plurality of ramps 402, 404, 406 directly or indirectly through rotating the cam 408. For example, a motor may be coupled to rotate the cam 408 based on an electrical control signal from control logic.

As shown, the ramp structure 308 includes a plurality of individual sliding ramp elements 402, 404 and 406 each including a plurality of ramps 310. As also shown, the cam structure 408 which is shown to move in a rotational manner, may also be structured to move in a non-rotational manner, such as a sliding manner if desired, or any other suitable manner. The cam structure includes ramp control elements 410 that, in this example, protrude from the cam structure to engage an edge of each of the respective individual sliding ramp elements 402, 404 and 406. The ramp control elements 410 are positioned to cause movement of the plurality of sliding ramp elements in response to movement of the cam structure 408. Actuation of the plurality of sliding ramp elements 402-406 may be done in response to the information set forth above such as based on a received wireless signal, battery level change condition, such as a recharge condition (actuate skin), low battery level (deactuate skin), an incoming call, or based on any other suitable condition. As such, a series of individual sliding panels are located beneath a flexible skin structure 320 and are actuated in this example by a cam structure. The pattern of ramp control elements 410 determine in what sequence the sliding panels are actuated. As noted, the cam structure can be driven by a motor or integrated into the device such that a hinge of a clam shell type device that may be found, for example, on a mobile handset may actuate the cam directly so that opening of the clam shell causes the raising of the portions of the flexible skin texture to represent a keypad. It will also be recognized that the mechanical actuation structure described may move any portion of the flexible skin structure 320 to provide, for example, raised portions that are not associated with a user interface and may be moved to provide any desired tactile configuration.

Figure 5:
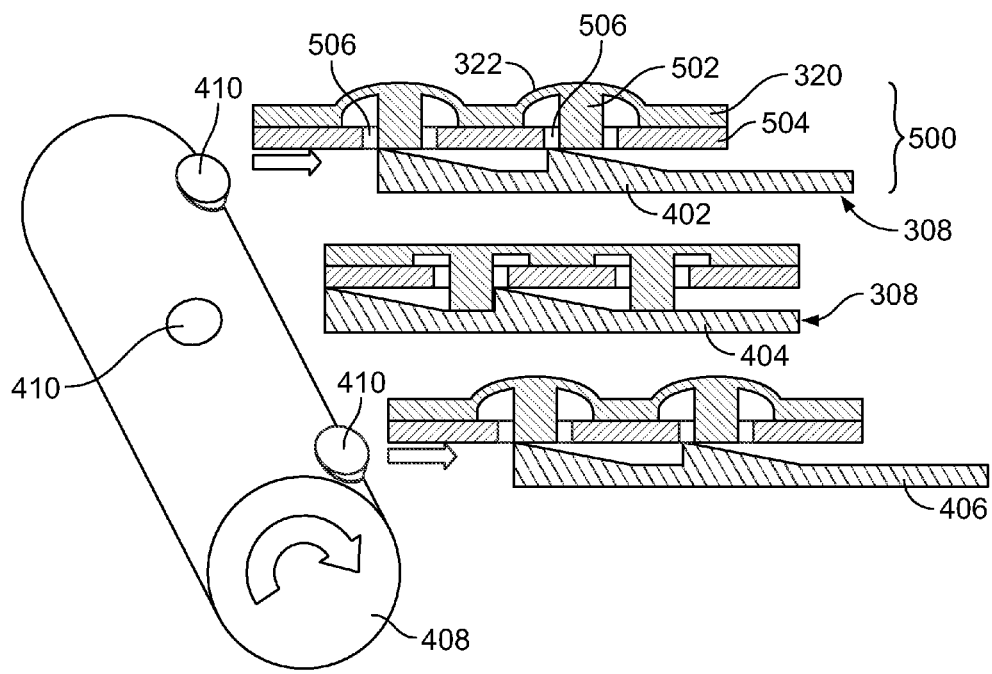
FIG. 5 is a perspective and side view of the structure shown in FIG. 4 and a portion of a flexible skin structure in accordance with one embodiment of the invention.

FIG. 5 shows a cross sectional view of a controllable skin texture surface 500 similar to that shown in FIG. 4 but in this example, the flexible skin structure 320 may also include tabs 502 that are integrally formed with the texture pockets 322 to assist in raising the center of the texture pockets 322, if desired. As also shown, the flexible skin structure 320 is also considered to include a plate structure 504 that includes openings 506 corresponding to each desired texture element. The openings 506 receive the tabs 502 configured to engage with the movable ramp structure 308. As shown, as the movable ramp structure 308 is moved, it raises or lowers portions of the flexible skin structure 320 in response to movement of the cam structure 408. In this example, the individual sliding elements 402 and 406 have been moved to raise portions of the flexible skin structure 320 whereas individual sliding element 404 has not been moved and therefore the flexible skin structure is flat at the appropriate locations. As previously noted above, if the device includes a movable housing portion such as a clam shell configuration or any other suitable configuration, the movable housing portion may be mechanically coupled to the cam structure 408 such that mechanical movement of the housing portion causes movement of the cam structure. Alternatively, the cam structure may be electronically controlled independent of any movable housing portion as desired. For example, a motor may be coupled to engage with the cam structure and move the cam structure in response to an electronic control signal to move one or more of the plurality of ramps to a desired location.

As described, the sliding movable ramp structure 308, 404-406 with wedge shaped features (e.g., ramps) moves horizontally to force tabs (e.g., pins) molded into the back of the flexible skin structure upwardly and thereby causes portions of the flexible skin structure corresponding to the texture pockets to be raised and thereby create a desired texture pattern. As noted above, a touch sensor, such as a capacitive sensor, may also be used to detect the touch of a user's finger against the flexible skin structure. The sensing may be used as an input to actuate the texture mechanism or to execute another function that would correspond to the press of a button. In addition, mechanical switches such as dome-type switches known in the art could be placed underneath portions of the movable ramp structure to allow a user to press and thereby actuate one or more of the switches.

Figure 6:
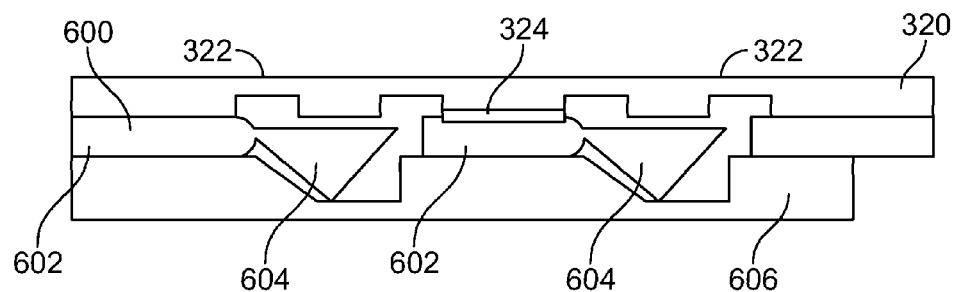
FIG. 6 is a cross-sectional view illustrating another example of a controllable skin texture surface that employs a mechanical actuation structure in accordance with one embodiment of the invention.
Figure 7:
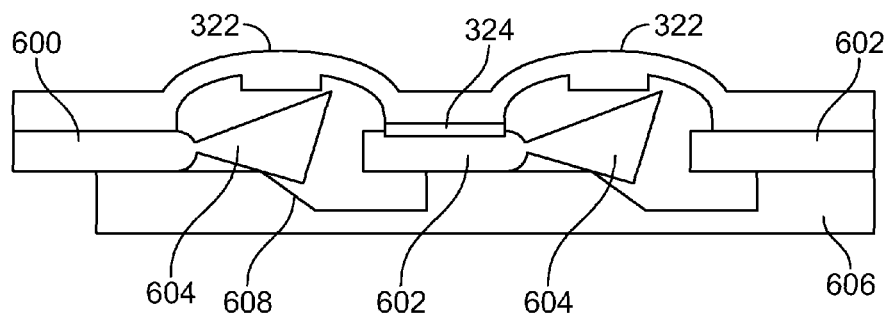
FIG. 7 is a cross-section view as shown in FIG. 6 with texture actuation in accordance with one disclosed example.

FIGS. 6 and 7 illustrate another example of a mechanical actuation structure that uses a movable ramp structure and flexible skin structure. In this example, the tabs 502 (FIG. 5) need not be utilized. Instead, a wedge shaped element 600 includes an anchored portion 602 and a movable wedge section 604 that pivots with respect to the anchored portion 602. Each wedge shaped element 600 that includes the anchored portion 602 and movable wedge section 604 may be secured in the device in a fixed location below the flexible skin structure 320 and above a sliding ramp or movable ramp structure 606. As the movable ramp structure 606 is moved horizontally, the pivotable wedge shaped elements 604 are moved by ramp sections 608 of the movable ramp structure 606 such that they come in contact with desired portions of the flexible skin structure 320. Among other advantages, this structure may provide reduced friction and wear between sliding elements and tabs molded into the flexible skin structure. Other advantages may be recognized by those of ordinary skill in the art. However, any desired flexible skin structure and ramp structure may be employed. Movement of the ramp structure causes movement of the wedge shaped elements and movement of the flexible skin structure to provide a change in tactile configuration. As also shown, the substrate anchored portion 602 serves as a substrate for the flexible skin structure 320 and is interposed between the flexible skin structure 320 and the movable ramp structure 606. A touch sensor 324 is supported by the substrate and located between at least two movable portions (e.g., 322) of the flexible skin structure. It will be recognized that the touch sensors 324 may be suitably located at any location depending upon the desired functionality of the portable electronic device.

Figure 8:
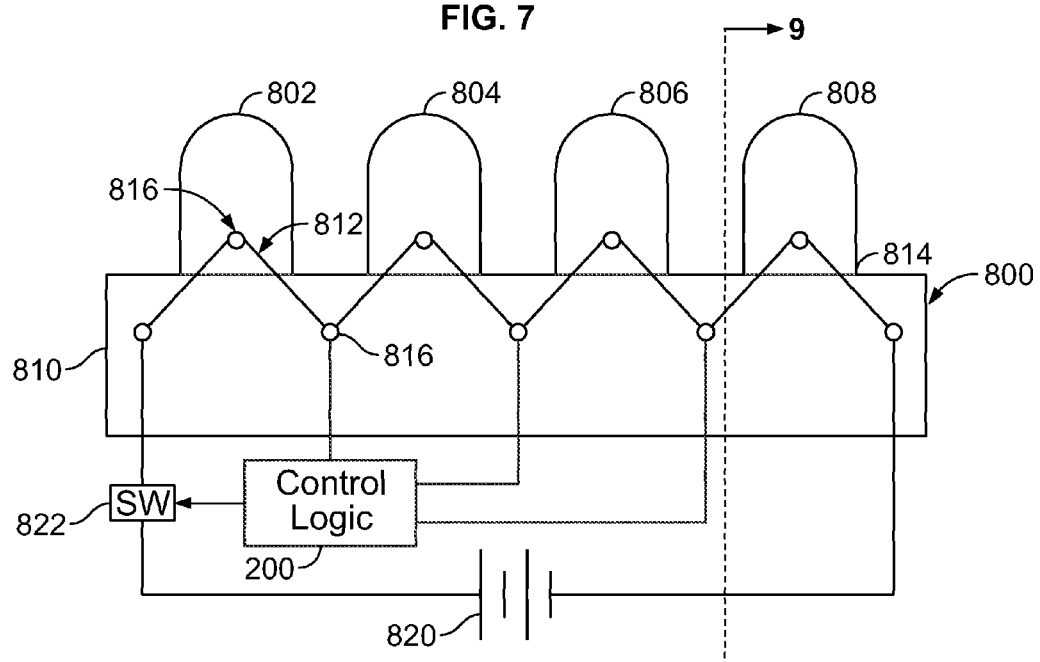
FIG. 8 is a top view of one example of a shape memory alloy actuation structure that may be employed as part of a controllable skin texture surface according to one example of the invention.
Figure 9:
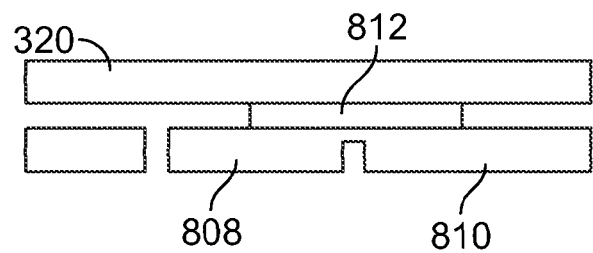
FIGS. 9 and 10a are cross-sectional views illustrating the operation of the structure shown in FIG. 8.
Figure 10A:
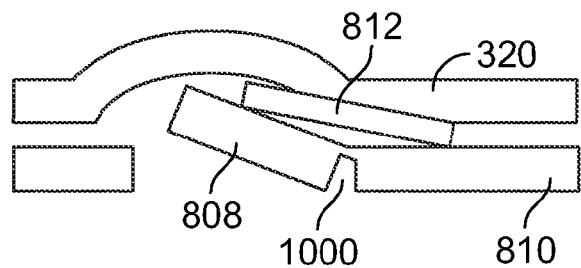

FIGS. 8, 9 and 10 illustrate an example of a shape memory alloy actuation structure 800 and a corresponding flexible skin structure 320 that moves in response to movement of a metal alloy 812 in the shape memory alloy actuation structure 800 in accordance with one embodiment. FIG. 8 is a top view illustrating a plurality of pivoting elements 802-808 that are pivotally connected with a base 810. The plurality of pivoting elements 802-808 pivot along pivot points generally indicated at 814 caused by, in this example, the lengthening and shortening of a shape memory alloy 812 such as nitinol wire, or any other suitable shape memory alloy. In one example, a single segment of shape memory alloy 812 may be connected to the pivoting elements 802-808 and to the base portion as diagrammatically illustrated as connection points 816. It will be recognized, however, that any suitable connection location or connection technique may be used to affix one or more shape memory alloy segments to one or more pivoting elements. It will also be recognized that the shape of the pivoting elements and their length and material may vary depending upon the particular application. One example for illustration purposes only, and not limitation, may include using polypropylene or nylon. Also the hinged area or pivot location 814 may be thinned if desired.

As shown, a voltage or current source 820 is selectively applied by opening and closing switch 822 by suitable control logic 200. In addition to, or alternatively, a separate segment of shape memory alloy may be used independently for each pivot element 802-808 so that each pivot element may be controlled independently by the control logic. However, for purposes of explanation, the discussion will assume that a single shape memory alloy element is used to move all the pivoting elements 802-808 at the same time. In any embodiment, when current is passed through the shape memory alloy, it shortens, causing the pivotal elements 802-808 to push up against the flexible skin. As such, the base 810 may be suitably mounted horizontally, for example, underneath the flexible skin structure and positioned so that the pivoting elements 802-808 suitably align with desired portions of the flexible skin structure to move (e.g., raise and lower) portions of the flexible skin structure. As noted, different or separate wires may be attached to different pivoting elements in order to provide selectively as to which texture elements are actuated. In this example, the controllable skin texture surface includes a skin texture actuation structure that includes a plurality of pivoting elements 802-808 having a shape memory alloy (whether single or multiple elements thereof) coupled to the skin texture to effect movement of the pivoting elements against the flexible skin structure which moves in response to movement of the plurality of pivoting elements. The movement of the pivoting elements change a tactile configuration of a portion of the controllable skin texture surface that is contacted by the pivoting elements. The control logic 200 activates, for example, switch 822 or a plurality of other switches to provide suitable current to control movement of the pivoting elements by applying current to the shape memory alloy element 812. If desired, a voltage source or current source may be provided for each individual pivoting element and may be selectively switched in/out to control the movement of each pivoting element as desired. Any other suitable configuration may be also be employed. Also, the flexible skin over the hinged elements will generally act to provide a restorative force that returns the elements to a planar state when the current through the SMA is turned off.

FIGS. 9 and 10 show a cross section of one pivoting element of FIG. 8 and further includes the illustration of the flexible skin structure 320 and further shows a pivoting element 808 in both an activated state (FIG. 10) where the flexible skin structure is raised, and an inactive state where the flexible skin structure 320 is flat (FIG. 9). As such in this example, the flexible skin structure 320 has pockets corresponding to desired texture features that are molded into the reverse surface or under surface thereof and bonded to a portion of the housing or other substructure within the device as noted above. A series of pivoting elements 802-808 underneath the flexible skin structure are connected, in one example, via a single length of shape memory alloy such that in a neutral position, the pivoting elements lie flat. When an electric current is run through the shape memory alloy, its length shortens by, for example, approximately 5% or any other length depending upon the type of shape memory alloy, and causes the pivoting elements to rise up and push against the flexible skin structure causing the appearance of a bump. When the electrical current is no longer applied, the flexible skin structure and underlying pivoting element returns to the neutral position due to tension in the flexible skin.

Figure 10B:
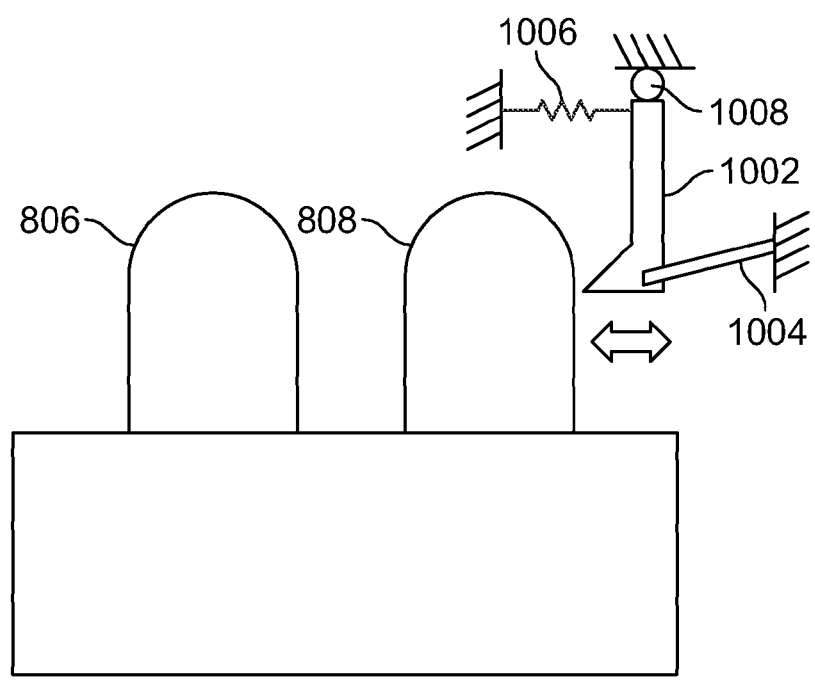
FIG. 10b is a diagram illustrating one example of a bi-stable shape memory alloy actuation scheme according to one example of the invention.

In another embodiment shown in FIG. 10b, a second series of pivoting elements 1002, as part of a hinge lock structure, may be introduced beneath the first series of pivotal elements 806, 808 to act as locks. When the first series of hinged elements 806, 808 are actuated, the second series of pivoting elements 1002 are positioned so as to fall in to gaps 1000 created by the motion of the first set of pivoting elements thereby locking them into the raised position or to simply position underneath the first pivotal elements. It will be recognized that any other location may also be used or that any other suitable technique may be employed. When the electric current applied to the corresponding shape memory alloy element 812 that moves the first set of hinged elements 808 is stopped, the locking action of the second set of elements 1002 holds the first pivoting elements 806, 808 in place by a biasing element 1006 pulling the elements 1002 under the elements 808. By applying an electric current to a shape memory alloy element 1004 connected to the second set of pivoting elements 1002, the first set of pivoting elements 806, 808 will be unlocked and thereby allows the first series of pivoting elements to return to a neutral position due to tension in the flexible skin. This provides a type of bi-stable shape memory alloy actuation scheme. As shown, an end of a biasing element 1006 such as a spring is fixedly attached to a portion of the housing or any other suitable structure and another end is caused to contact a portion of the pivotal second set of elements 1002. The pivotal second set of elements may be made of any suitable structure such as plastic that suitably bends about a pivot point shown as 1008. As shown, a portion of the pivoting elements 1002 are also fixedly attached to a structure of the device to prevent movement of an end thereof. Similarly, the shape memory alloy element 1004 associated with each locking element 1002 also has a portion connected to the element 1002 as well as a fixed structure. The locking element swings as shown, in this example in plane of the FIG. 10b, for example, to block the hinged element 808 from lowering down into the plane of the page as shown. As such, the locking feature moves in the plane of the surface to lock the hinged elements. This as opposed to, for example, moving out of the plane in an opposite direction of the hinged element, which may also be done if desired. The thickness of the overall implementation, however, may be less if the locking element is caused to move in plane to the figure as shown. In this example, the hinged elements 808 rise out of the plane when actuated by an SMA element or actuator (not shown) and is blocked by the locking element moving in plane of the figure as shown. It will be recognized that although a single locking element 1002 is shown, that a suitable array of locking elements may be positioned for any respective pivoting hinged element 808. In addition, it will be recognized that in this example, a configuration as shown that provides a passive lock and an active unlock condition. However, it will be recognized that by reversing the bias element and the shape memory alloy element 1006 and 1004 respectively, that an active lock and a passive unlock structure may be employed. Hence, one or more pivoting elements serves as a type of pivot lock structure made of a shape memory alloy, the same type for example, as noted above. The pivot lock structure is coupled to the control logic 200 and is controlled to be positioned to lock the pivoting elements in a desired position. The pivot lock structure may be alternately positioned to passively lock the pivoting elements in a desired position, and then controlled to release them when desired. As such the control logic controls the second shape memory alloy to deactuate the hinge lock structure to unlock the plurality of hinged elements in response to a passive actuation of the hinge lock structure.

A method for actuating a controllable skin texture surface includes, for example, controlling the first shape memory alloy to actuate the plurality of pivoting elements. In response to the actuation, the pivot lock structure will naturally act to lock the plurality of pivoting elements in a first position. The method includes deactivating the first shape memory alloy in response to the pivot lock structure being actuated. This allows the current to the first pivoting element to be removed and it is locked in place. The method may also include then unlocking the hinged elements by, for example, by actuating the first shape memory alloy and then controlling the second shape memory alloy to unlock the hinge lock structure by applying current to the shape memory alloy actuator that moves the lock structure to unlock the pivoting elements from their raised position.

Figure 11:
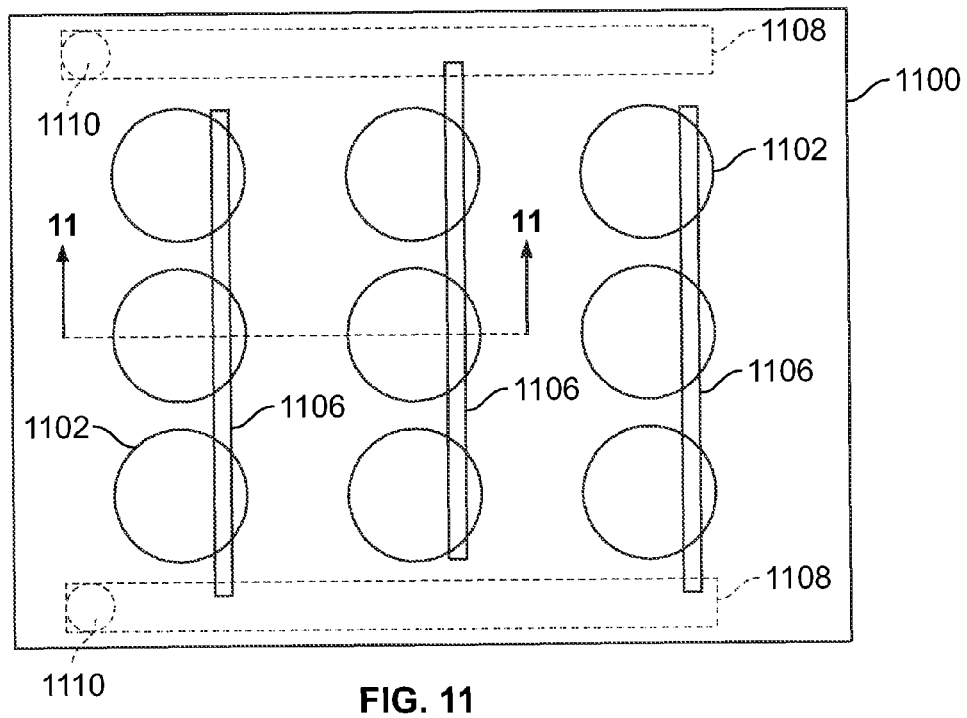
FIG. 11 is a top view illustrating a portion of a portable electronic device that employs an embodiment of a controllable skin texture surface.
Figure 12:
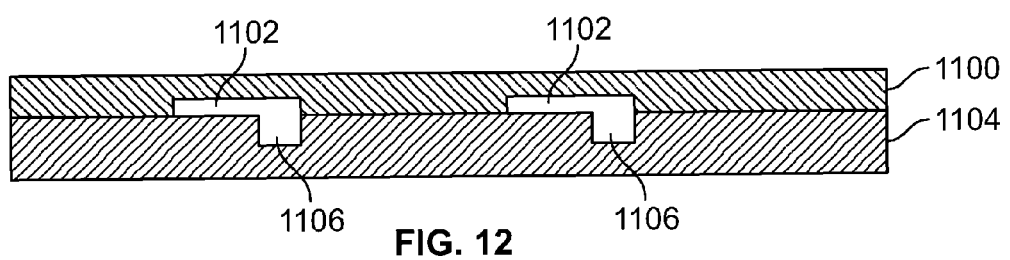
FIGS. 12 and 13 are cross sectional views of portions of FIG. 11 illustrating a deactuated and actuated skin texture structure in accordance with one embodiment.
Figure 13:
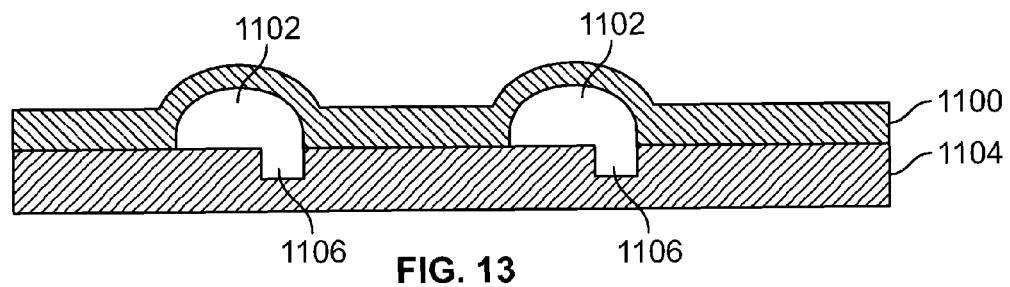

FIG. 11 illustrates a portion of a portable electronic device that employs an embodiment of a controllable skin texture surface, and in this example, the portion of the electronic device is shown to be a keypad. In this example, the controllable skin texture surface includes a skin texture surface actuation structure that includes a hydraulic actuation structure that causes a change in tactile configuration of a flexible skin structure in response to movement of fluid underneath the flexible skin structure. FIGS. 12 and 13 are cross sectional views of a portion of FIG. 11 and will be described together with FIG. 11. A flexible skin structure 1100 similar to that described above with respect, for example, to FIG. 3 and elsewhere, includes fluid chambers or pockets 1102 corresponding to desired texture features that are molded into a reverse surface of the flexible skin structure. As also shown above, the wall thickness of the pockets may be thinner than other portions of the flexible skin texture to allow less resistance to fluid expansion. The flexible skin structure 1100 is bonded, for example, to a surface of the housing of the portable electronic device to form suitable seals around the various fluid chambers 1102. A supporting substrate 1104 which may be the housing of the device or a separate substrate within the device, includes fluid channels 1106 formed therein that are positioned to be in fluid communication with the fluid chambers 1102. It will be recognized that any suitable structure of first channels 1106 may be used including separate channels that allow the activation of any suitable texture location, depending upon the desired application.

As shown in FIGS. 12 and 13 for example, when fluid is removed from the channels 1106, the flexible skin structure 1100 is flat or in an unactuated state, and when an appropriate amount of fluid is moved into the various chambers, the flexible skin structure is actuated at appropriate locations to provide a three dimensional pattern on an outer surface of the portable electronic device. As shown, the channels 1106 are fluidly connected with one or more manifolds 1108 that may be molded into a surface of the housing or substrate 1104 or be a separate structure if desired. Separate positive displacement pumps (not shown) or one pump may be fluidly coupled to an inlet 1110 in each of the manifolds. The manifolds 1108 as described are in fluid communication with one or more fluid reservoirs via one or more pumps. Control logic 200 sends the appropriate control information to cause the positive displacement pumps to transfer fluid from an internal reservoir (not shown) in the device through the manifold and into the channels and hence the chambers molded into the rear surface of the flexible skin structure 1100. The hydraulic actuation structure includes in this example, the substrate 1104 that includes one or more fluid channels 1106 and the flexible skin structure 1100 is suitably affixed to the substrate either directly or through any suitable intermediate structures. The flexible skin structure 1100 includes a plurality of fluid pockets also shown as 1102 corresponding to texture features. The fluid pockets 1102 are in fluid communication with the fluid channels 1106 to allow fluid to be added to or removed from the chamber to actuate or deactuate the respective texture feature.

In one example, as noted above, fluid pumps may be controlled via control logic. In another embodiment, the pumps may be activated via mechanical movement of a movable portion of the housing, such as a movement of a clam shell such that, for example, the rotational movement of a housing portion causes the fluid to be pumped into the fluid chambers. In one example, the pump is controlled to reverse fluid flow when the flip portion is closed. As such, there may be a fluid pump operative to move fluid into the fluid passages (and out of the passages) and a movable housing portion that is coupled with the fluid pump such that mechanical movement of the housing portion causes the fluid pump to pump fluid in at least one fluid passage. The movement of the movable housing portion in another direction may serve to remove fluid from the one or more respective chambers and return it to an internal reservoir.

Figure 14:
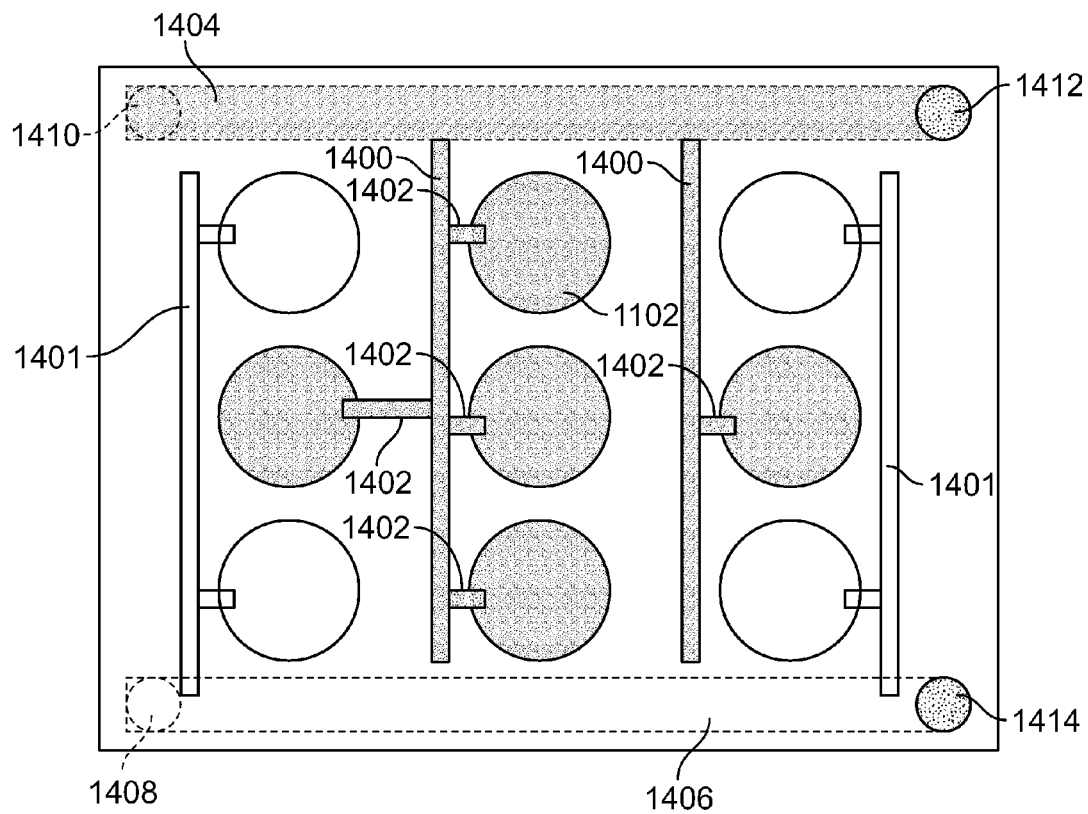
FIG. 14 is a top view illustrating a portion of a portable electronic device that employs an embodiment of a controllable skin texture surface.

FIG. 14 illustrates another embodiment of a hydraulic actuation structure and flexible skin structure that in this example, shows fluid channels 1400 with additional fluid channels 1402 connected with specific chambers that are molded into a rear surface of the flexible skin structure 1100. The flexible skin structure includes multiple features wherein movement of each of the features is controlled independently. The fluid channels 1400 are in fluid communication with the manifold 1404 whereas other chambers 1401 are in fluid communication with manifold 1406. As also shown, suitable pump inlets 1408 and 1410 are shown that are in fluid communication with pumps (not shown). In addition, light sources 1412 and 1414 are positioned in proximity to the respective manifold 1404 and 1406 to serve as a light source (such as one or more colored LEDs) and a clear fluid may be used to act as a light guide to direct the light from the internal light sources to, for example, translucent flexible portions of the flexible skin structure. Alternatively, the fluid itself may be colored so as to make the raised texture elements visually distinct by the change in color due to the color fluid contained therein. Any other suitable combination may also be employed if desired. The light sources may be suitably controlled to turn on and off as desired based on an incoming call, user programmed sequence, be activated by a ring tone, or may be controlled in any other suitable manner by the control logic.

Figure 15:
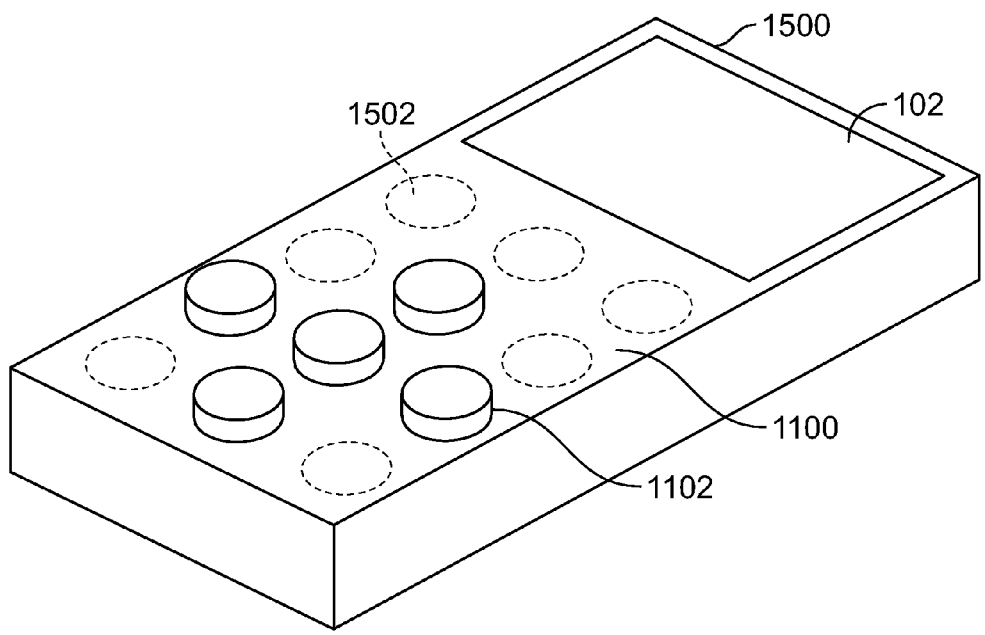
FIG. 15 is a perspective view of a portable electronic device with a controllable skin texture surface in accordance with one embodiment.

FIG. 15 illustrates one example of the portable electronic device 1500 with the appearance of a 3D pattern with five tactile surfaces being actuated. Unactuated portions 1502 are shown to be flat in this particular example.

Figure 16:
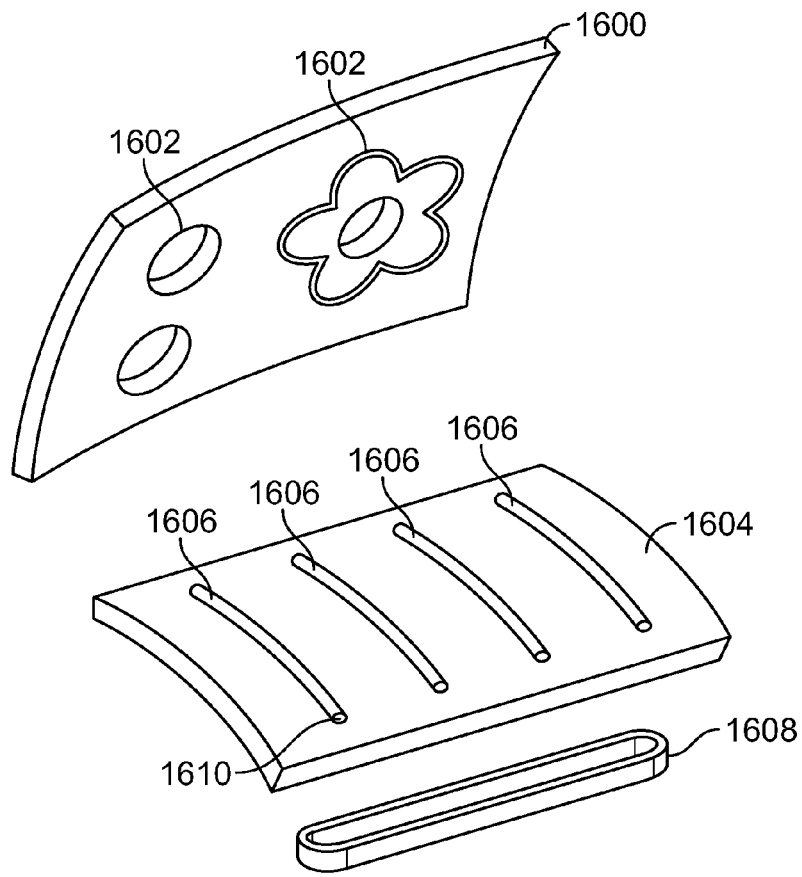
FIG. 16 is a perspective view illustrating one example of a flexible skin structure and corresponding portion of a hydraulic actuation structure in accordance with one example set forth in disclosure.

FIG. 16 illustrates an alternative embodiment wherein the flexible skin structure 1600 includes molded pocket patterns 1602 in an under portion thereof to receive fluid. A rigid substrate 1604 includes the suitably positioned fluid channels 1606 that are in fluid communication with one or more manifolds 1608 and also include a pump inlet. The manifold 1608 is attached to a rear side of the right substrate 1604 and is in fluid communication with channels 1606 through openings 1610. Each of the microchannels include, for example, openings 1610 to allow fluid to pass from the manifold into the channel 1606 as described above. One or more pumps may also be used as noted above to raise and lower the pattern 1602 by passing fluid in or out of the channel 1606. As such, in this example, if the pattern 1602 is placed, for example, on the back of a cell phone or on the face of a cell phone, the outer skin of the cell phone may be activated to give a three dimensional texture that may be suitably activated and deactivated as desired. The channels 1606 may be positioned with sufficiently fine spacing that they provide any suitable texture pattern to be actuated. It will also be recognized that the skin texture may have one or more cover layers to protect the skin texture from damage from ultraviolet radiation, physical scratches, or any other potential hazards.

Figure 17:
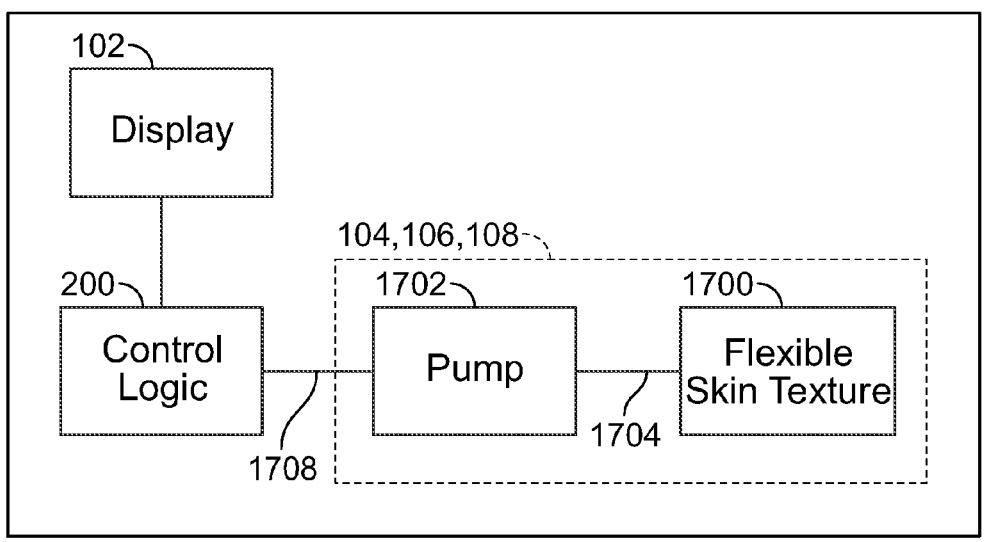
FIG. 17 is a block diagram illustrating the portion of a portable electronic device in accordance with one example.

FIG. 17 is a block diagram illustrating one example of the structure 1700 for controlling the hydraulic controllable skin texture surface examples noted above. The device may include one or more fluid pumps 1702 which provide fluid 1704 to and from the controllable skin texture surface. Control logic, in one example, shown as 200 provides suitable control information 1708 in the form of analog or digital signals, for example, to control the one or more fluid pumps 1702 to provide the fluid 1704 in a controlled manner to actuate and deactuate one or more portions of a flexible skin to provide a three dimensional tactile configuration as desired. It will also be recognized that instead of a fluid, a pressurized gas could be employed.

Figure 18A:
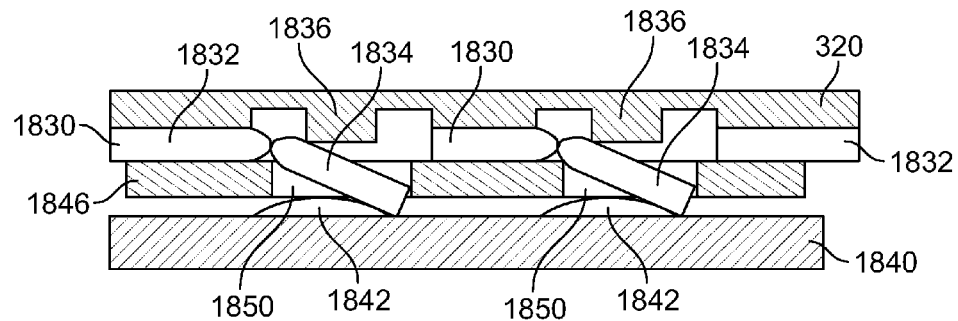
FIGS. 18a and 18b illustrate a cross sectional view of an embodiment employing a flexible sliding plate in accordance with one embodiment of the invention.
Figure 18B:
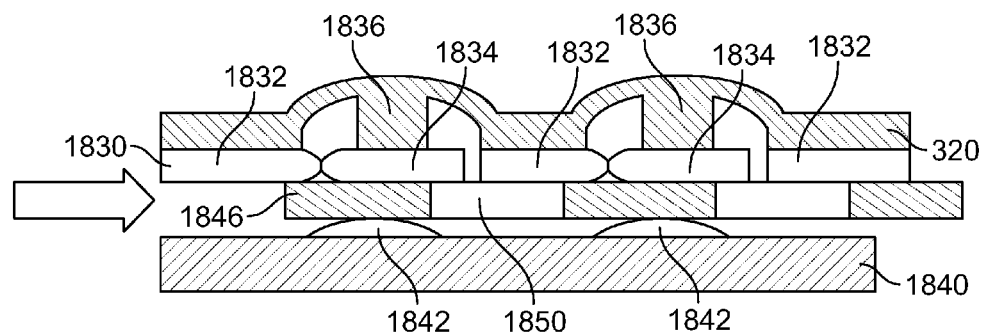

FIGS. 18a and 18b illustrate another embodiment wherein, instead of a sliding ramp structure (for example as shown in FIGS. 6 and 7), a plurality of hinged elements 1830 that have an anchored portion 1832 attached to the flexible skin structure 320 through a suitable adhesive or through any other suitable attachment mechanism. Each of the hinged elements 1830 also have a movable section 1834. The flexible skin structure 320 includes pins 1836 which are, for example, longer than those shown in FIG. 6.

The device further includes a substrate 1840 such as, for example, a printed circuit board which has attached thereto, dome switches 1842 as known in the art. The dome switches 1842 are positioned to align under the pins. A flexible sliding member 1846 is interposed between the substrate 1840 and the anchored portion 1832 underneath the flexible skin surface 320. The flexible sliding member 1846 may be made from, for example, nylon or polypropylene sheet, or other suitably flexible material that allows motion of the movable section of the hinged element 1834 to be transferred to the dome switch 1842. Holes 1850 in the flexible sliding member 1846 allow the movable sections of hinged elements 1834 to rotate downward toward the substrate 1840, as shown in FIG. 18a. It can be seen that when the flexible sliding member 1846 is in the position shown in FIG. 18a, the end of the movable section of the hinged element 1834 may be designed so as to come in contact with the substrate 1840 such that pressing the flexible surface 320 will not actuate the dome switch 1842.

As shown in FIG. 18b, the flexible sliding member 1846 is moved, as described above based on any suitable structure to activate and in this case, raise portions of the flexible skin structure 320. However, since the material is compressible, when a user presses on a top surface of the flexible skin structure 320, the pin causes the moving portion 1834 to press down upon the flexible material of the flexible sliding member 1846 and depress the dome switch 1842. As such, in this embodiment, a user may activate the dome switch only when the flexible skin texture is actuated. It will be recognized that the geometry of the movable section of the hinged element 1834 may also be designed such that the dome switch may be actuated by pressing the flexible skin 320 whether the skin is in either the actuated or unactuated state (FIGS. 18b and 18a, respectively). Among other advantages, this embodiment may allow the flexible sliding member 1846 to be stamped rather than, for example, molded and also uses conventional dome switches in combination thereby providing a potentially lower cost structure. The hinged elements 1830 may be made of any suitable material such as nylon, polypropylene sheet or any other suitable material as desired. As also noted above, the flexible sliding member may be configured as a sliding member that slides along rails formed in a housing or other structure or may be configured in any other suitable manner as desired.

Figure 19:
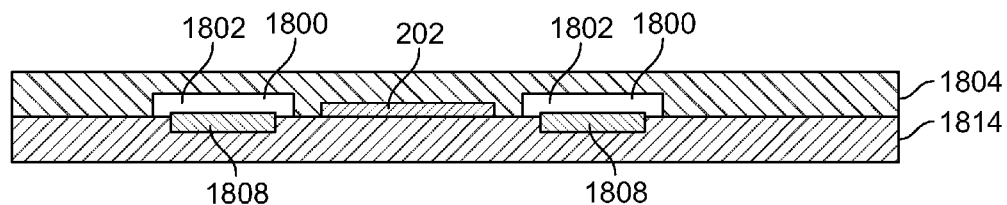
FIGS. 19 and 20 illustrate cross sectional views of another example of a gas expandable actuation structure and flexible skin structure in accordance with one example.
Figure 20:
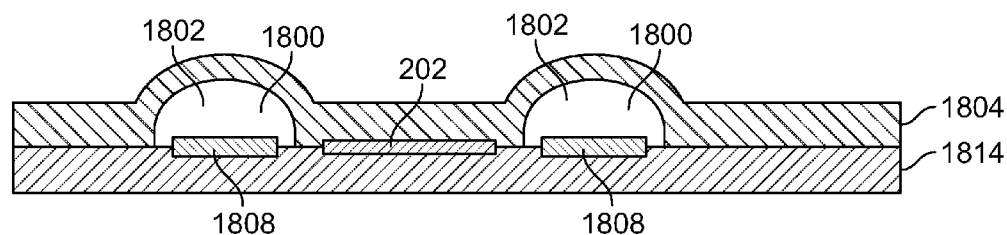

FIGS. 19-20 illustrate another example of a controllable skin texture surface structure that employs an expandable gas actuation structure to raise and lower desired portions of a flexible skin structure to provide a controllable tactile surface of a portable electronic device. As shown in FIG. 18, a skin texture surface actuation structure includes an expandable gas actuation structure that includes a gas therein 1802 such as air, or a material such as Freon or alcohol that changes from liquid to gas at a specified temperature and pressure, and a flexible skin structure 1804 such as the type described above. The expandable gas actuation structure includes a gas chamber 1800 that is thermally coupled to a heating element 1808 such as an electrical resistor, or any other suitable structure, that may be turned on and off by control logic as desired to heat the gas 1802 within the chamber 1800 and cause the gas to expand. The expansion of the gas 1802 causes the gas to expand and fill the chamber 1800 of the flexible skin structure 1804. When the heating element 1808 is turned off, the gas cools and the chamber 1800 collapses to put the flexible skin structure in an unactuated state. As such, the flexible skin structure 1804, as also described above, includes pockets corresponding to desired texture features wherein the pockets or chambers are molded into the reverse surface or an undersurface of the flexible skin structure 1804. The flexible skin structure 1804 is attached to a substrate 1814 as described above, which may be part of the housing of the device or any other structure. It is bonded so as to provide a sealed environment so that the gas 1802 in the chamber 1800 cannot escape the chamber 1800. When an electric current is sent through the heating element 1808, the increased temperature causes the trapped gas in the pockets to expand thereby raising the pocket or outer surface over the chamber 1810. The flexible skin structure includes expandable portions (e.g., pockets) that define a plurality of gas chambers. Each of the gas chambers includes a controllable heating element that may be activated together or individually.

The substrate 1814 includes a heating element(s) 1808 corresponding to each respective texture element. In addition, as noted above, all of the examples described herein may include one or more touch sensors 202 which may be used in any suitable manner. FIG. 19 shows a deactivated state of the flexible skin texture and FIG. 20 shows an activated state of the flexible skin structure 1804.

Figure 21:
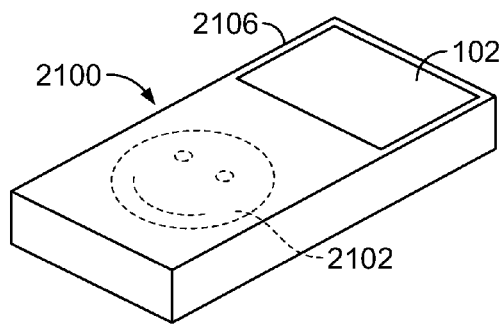
FIGS. 21 and 22 illustrate a perspective view of a portable electronic device with a deactuated and actuated controllable skin texture surface.
Figure 22:
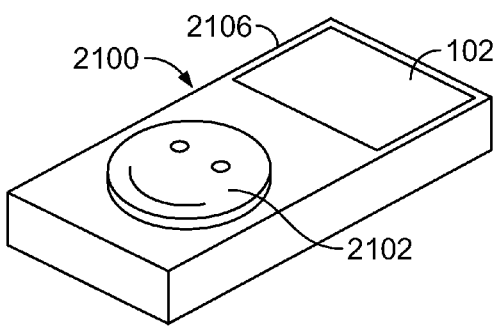

FIGS. 21 and 22 diagrammatically illustrate one example of a controllable skin texture surface 2102 with a particular pattern 2102 that may be activated and nonactivated using one or more of the above described actuation structures based on any suitable condition. In this example, the tactile configuration or pattern 2102 may simply be located on an outer surface of the portable electronic device 2106 and need not be part of a user interface but instead provides a unique visual experience and tactile experience for a user.

Figure 23:
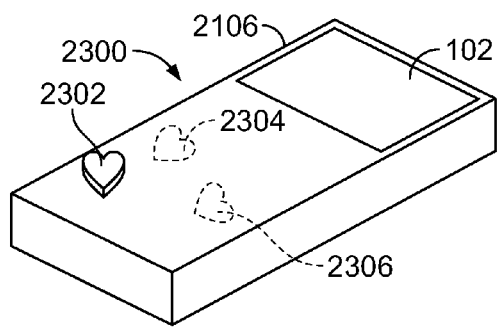
FIGS. 23-25 illustrate a perspective view of a portable electronic device illustrating different portions of a controllable skin texture being actuated and deactuated in accordance with one example disclosed below.
Figure 24:
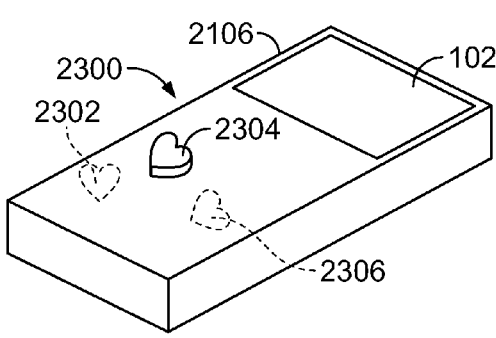
Figure 25:
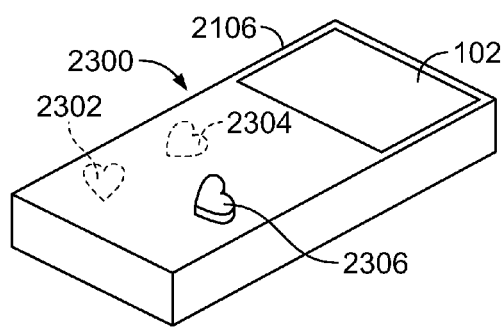

FIGS. 23-25 illustrate yet another example of controlling of a controllable skin texture surface 2300 (here shown as multiple hearts) of the types described above wherein a different portion 2302-2306 is activated at different points in time by control logic to give a visual appearance or tactile feel of a moving object. In this example, a "heart" in the pattern is activated at different times. Also, animation of texture, such as variations in surface texture over time, may be used to animate a character or feature. It will be recognized that the above description and examples are merely for illustrative purposes only and that any suitable configurations, designs or structures may be employed as desired.

Among other advantages, a portable electronic device includes controllable skin texture surfaces to provide unique user experiences by providing different tactile configurations (and/or visual appearances) by selectively controlling portions of a flexible skin structure using various skin texture surface actuation structures. Also, all of the controllable skin texture surface configurations herein can be employed in the handheld wireless device shown in FIG. 1 or any suitable device. Other advantages will be recognized by those of ordinary skill in the art.

The above detailed description of the invention, and the examples described therein, has been presented for the purposes of illustration and description. While the principles of the invention have been described above in connection with a specific device, it is to be clearly understood that this description is made only by way of example and not as a limitation on the scope of the invention.

What is claimed is:

1. A portable electronic device comprising:
   a controllable skin texture surface comprising a skin texture surface actuation structure that is comprised of a plurality of hinged elements having a first shape memory alloy coupled thereto to effect movement of the hinged elements and a flexible skin structure that moves in response to movement of the plurality of hinged elements to change a tactile configuration of at least a portion of the controllable skin texture surface.

2. The portable electronic device of claim 1 comprising control logic operatively coupled to the shape memory alloy to control movement of the hinged elements.

3. The portable electronic device of claim 2 wherein the control logic is operative to control the controllable skin texture surface to change the tactile configuration of a user interface key of the portable electronic device.

4. The portable electronic device of claim 2 comprising a hinge lock structure comprising a second shape memory alloy, operatively coupled to the control logic and positioned to controllably lock the hinged elements in a desired position.

5. The portable electronic device of claim 4 wherein the control logic is operative to:
   control the first shape memory alloy to actuate the plurality of hinged elements;
   in response, control the second shape memory alloy to actuate the hinge lock structure to lock the plurality of hinged elements in a first position;
   deactivate the first shape memory alloy in response to the hinge lock structure being actuated; and
   unlock the plurality of hinged elements by actuating the first shape memory alloy and thereby allow the hinge lock to disengage.

6. A handheld wireless device comprising:
   a wireless telephone subsystem;
   a display operatively coupled to the wireless telephone subsystem; and
   a controllable skin texture surface comprising:
      a skin texture surface actuation structure that is comprised of a plurality of hinged elements having a first shape memory alloy coupled thereto to effect movement of the hinged elements; and
      a flexible skin structure that moves in response to movement of the plurality of hinged elements to change a tactile configuration of at least a portion of the controllable skin texture surface.

7. The handheld wireless device of claim 6 comprising control logic operatively coupled to the shape memory alloy to control movement of the hinged elements.

8. The handheld wireless device of claim 7 wherein the control logic is operative to control the controllable skin texture surface to change the tactile configuration of a non-user interface portion of the portable electronic device.

9. The portable electronic device of claim 7 wherein the control logic is operative to control the controllable skin texture surface to change the tactile configuration of a user interface key of the portable electronic device.

10. The portable electronic device of claim 7 comprising a hinge lock structure comprising a second shape memory alloy, operatively coupled to the control logic and positioned to controllably lock the hinged elements in a desired position.

11. The portable electronic device of claim 10 wherein the control logic is operative to:
- control the first shape memory alloy to actuate the plurality of hinged elements;
- in response, control the second shape memory alloy to actuate the hinge lock structure to lock the plurality of hinged elements in a first position;
- deactivate the first shape memory alloy in response to the hinge lock structure being actuated; and
- unlock the plurality of hinged elements by actuating the first shape memory alloy and thereby allow the hinge lock to disengage.

12. The portable electronic device of claim 10 wherein the first and second shape memory alloys are comprised of nitinol wire.

13. A method comprising:
- controlling a first shape memory alloy to actuate a plurality of hinged elements;
- in response, controlling a second shape memory alloy to actuate a hinge lock structure to lock the plurality of hinged elements in a first position;
- deactivating the first shape memory alloy in response to the hinge lock structure being actuated; and
- unlock the plurality of hinged elements by actuating the first shape memory alloy and thereby allow the hinge lock to disengage.

14. A portable electronic device comprising:
- a controllable skin texture surface comprising a skin texture surface actuation structure that is comprised of a plurality of hinged elements having a first shape memory alloy coupled thereto to effect movement of the hinged elements and a flexible skin structure that moves in response to movement of the plurality of hinged elements to change a tactile configuration of at least a portion of the controllable skin texture surface;
- control logic operatively coupled to the shape memory alloy to control movement of the hinged elements; and
- wherein the control logic is operative to control the controllable skin texture surface to change the tactile configuration of a non-user interface portion of the portable electronic device.

15. A portable electronic device comprising:
- a controllable skin texture surface comprising a skin texture surface actuation structure that is comprised of a plurality of hinged elements having a first shape memory alloy coupled thereto to effect movement of the hinged elements and a flexible skin structure that moves in response to movement of the plurality of hinged elements to change a tactile configuration of at least a portion of the controllable skin texture surface;
- control logic operatively coupled to the shape memory alloy to control movement of the hinged elements;
- a hinge lock structure comprising a second shape memory alloy, operatively coupled to the control logic and positioned to controllably lock the hinged elements in a desired position; and
- wherein the first and second shape memory alloys are comprised of nitinol wire.

16. A portable electronic device comprising:
- a controllable skin texture surface comprising a skin texture surface actuation structure that is comprised of a plurality of hinged elements having a first shape memory alloy coupled thereto to effect movement of the hinged elements and a flexible skin structure that moves in response to movement of the plurality of hinged elements to change a tactile configuration of at least a portion of the controllable skin texture surface;
- control logic operatively coupled to the shape memory alloy to control movement of the hinged elements;
- a hinge lock structure comprising a second shape memory alloy, operatively coupled to the control logic and positioned to controllably lock the hinged elements in a desired position; and
- wherein the control logic is operative to:
  - control the second shape memory alloy to deactuate the hinge lock structure to unlock the plurality of hinged elements in response to a passive actuation of the hinge lock structure.

17. The portable electronic device of claim 1 wherein the first shape memory alloy is operable to move in response to current being passed therethrough or in response to a voltage being applied thereto.

* * * * *